United States Patent
Smith et al.

(10) Patent No.: US 8,930,853 B2
(45) Date of Patent: Jan. 6, 2015

(54) ORGANIZATION REPRESENTATION FRAMEWORK AND DESIGN METHOD

(75) Inventors: Simon Smith, York (GB); Dick Whittington, York (GB); Simon Hodgson, York (GB)

(73) Assignee: Mood Enterprises Ltd, Berkshire (GB)

( * ) Notice: Subject to any disclaimer, the term of this patent is extended or adjusted under 35 U.S.C. 154(b) by 515 days.

(21) Appl. No.: 10/844,631

(22) Filed: May 13, 2004

(65) Prior Publication Data

US 2004/0236618 A1  Nov. 25, 2004

(30) Foreign Application Priority Data

May 14, 2003 (GB) .................................. 0311026.9

(51) Int. Cl.
*G06F 3/048* (2013.01)
*G06Q 10/08* (2012.01)
*G06Q 10/06* (2012.01)

(52) U.S. Cl.
CPC ............ *G06Q 10/08* (2013.01); *G06Q 10/0631* (2013.01)
USPC ............................ 715/854; 715/853; 715/855

(58) Field of Classification Search
USPC .................. 715/700, 853, 854, 855, 2; 705/1; 707/3, 100–102; 703/2, 3
See application file for complete search history.

(56) References Cited

U.S. PATENT DOCUMENTS

| | | | |
|---|---|---|---|
| 5,892,947 A | 4/1999 | DeLong et al. | 703/22 |
| 6,028,602 A | 2/2000 | Weidenfeller et al. | 345/781 |
| 6,097,887 A | 8/2000 | Hardikar et al. | 717/105 |
| 6,167,395 A | 12/2000 | Beck et al. | 707/3 |
| 6,173,297 B1 | 1/2001 | Moon et al. | 715/515 |
| 6,173,438 B1 | 1/2001 | Kodosky et al. | 717/105 |
| 6,192,314 B1 | 2/2001 | Khavakh et al. | 701/209 |
| 6,199,193 B1 | 3/2001 | Oyagi et al. | 717/101 |
| 6,219,055 B1 | 4/2001 | Bhargava et al. | 345/420 |
| 6,385,724 B1 | 5/2002 | Beckman et al. | 713/167 |

(Continued)

FOREIGN PATENT DOCUMENTS

| | | |
|---|---|---|
| EP | 0749077 A2 | 12/1996 |
| EP | 0883057 | 12/1998 |

(Continued)

OTHER PUBLICATIONS

Lane, Charles; "Methods for transitioning from soft system methodology (SSM) models to object oriented analysis (OOA), developed to support the army operational architecture (AOA) and an example of its application"). Created on: May 1999, Modified Sep. 2000.*

(Continued)

*Primary Examiner* — Haoshian Shih
(74) *Attorney, Agent, or Firm* — Head, Johnson & Kachigian, P.C.

(57) ABSTRACT

The invention relates to a method and apparatus for developing a business and/or technical architecture of an organization. The invention includes the ability to identify and create specific elements which are required for a specific architecture framework and putting these specific elements together within a set of models or views, and allowing access through a visual representation of the architecture framework, along with an apparatus comprising the technical features to accommodate the method allow selection of one or a number of elements to generate further visualizations and/or links to further database or operating tools while allowing interaction with know organizational representations.

18 Claims, 4 Drawing Sheets

(56) References Cited

U.S. PATENT DOCUMENTS

| | | | |
|---|---|---|---|
| 6,430,609 B1 | 8/2002 | Dewhurst et al. | 709/220 |
| 6,442,557 B1* | 8/2002 | Buteau et al. | 707/102 |
| 6,442,620 B1 | 8/2002 | Thatte et al. | 719/316 |
| 6,539,379 B1 | 3/2003 | Vora et al. | 707/6 |
| 6,571,232 B1 | 5/2003 | Goldberg et al. | 707/2 |
| 6,662,355 B1 | 12/2003 | Caswell et al. | 717/103 |
| 6,718,366 B2 | 4/2004 | Beck et al. | 709/204 |
| 6,745,382 B1 | 6/2004 | Zothner | 717/107 |
| 6,774,911 B2* | 8/2004 | Hodgson et al. | 345/619 |
| 6,813,587 B2 | 11/2004 | McIntyre et al. | 702/183 |
| 6,859,217 B2* | 2/2005 | Robertson et al. | 715/853 |
| 6,874,119 B2 | 3/2005 | Macleod et al. | 715/201 |
| 6,910,072 B2 | 6/2005 | Macleod et al. | 715/500.1 |
| 6,983,321 B2* | 1/2006 | Trinon et al. | 709/224 |
| 7,035,694 B2 | 5/2006 | Feder | 707/104.1 |
| 7,120,643 B2* | 10/2006 | Dill | 707/102 |
| 7,120,896 B2* | 10/2006 | Budhiraja et al. | 717/105 |
| 7,162,427 B1* | 1/2007 | Myrick et al. | 705/1 |
| 7,171,647 B1 | 1/2007 | Smith et al. | 717/105 |
| 7,219,327 B1 | 5/2007 | Jacobs et al. | 717/104 |
| 2001/0042063 A1 | 11/2001 | Ebert | 345/854 |
| 2002/0032669 A1 | 3/2002 | Smith et al. | 706/21 |
| 2002/0059264 A1 | 5/2002 | Fleming et al. | 707/100 |
| 2002/0089550 A1 | 7/2002 | Orbanes et al. | 345/853 |
| 2002/0198727 A1* | 12/2002 | Ann et al. | 705/1 |
| 2004/0172319 A1* | 9/2004 | Eder | 705/7 |
| 2004/0243520 A1 | 12/2004 | Bishop et al. | 705/75 |
| 2005/0021348 A1* | 1/2005 | Chan et al. | 705/1 |

FOREIGN PATENT DOCUMENTS

| | | |
|---|---|---|
| EP | 1271380 A2 | 1/2003 |
| EP | 1280088 A2 | 1/2003 |
| WO | WO0102952 | 1/2001 |
| WO | WO0122331 | 3/2001 |

OTHER PUBLICATIONS

MooD transformation toolset data sheet, 2004.*

"Powerful business transformation parnership enabling sustainable growth in e-business" http://web.archive.org/web/20000712093414/www.tsorg.com/pressrelease.thm.

Pyron, Tim, "Special Edition: Using Microsoft Project 98", Que Publishing, 1997, pp. 1033.

"Framework for Enterprise Architecture", John Zachman.

Salamander, "MooD Transformation Toolset Data Sheet", 2005.

Salamander Org. "MooD Transformation Toolset", www.mood.co.uk.2006.

Salamander, "Mood", http://web.archive.org/web/20001203010400/www.salamander-organzation.co.uk/mood.htm.2000.

Salamander, "Salamander", http://web.archive.org/web/20000303085028/http://www.tsorg.com/, 2000.

PCWorld, http://www.pcworld.com/downloads/file_description/0.fid, 6311,00.asp.

* cited by examiner

ORGANIZATION REPRESENTATION FRAMEWORK AND DESIGN METHOD

CROSS-REFERENCE TO RELATED APPLICATION

This is a United States patent application entitled "Organization Representation Framework And Design Method" which claims priority to British Application No. 0311026.9 filed May 14, 2003.

The invention to which this application relates is to the provision of a framework and system to allow improved representation, both in terms of the visual representation, and the system which allows the generation of the visual representation of organizations with regard to integration, re-use and multiple perspectives. The representation which is provided is typically that of an organization or a series of organizations. In particular, the representation is aimed at providing to the user a series of visual representations which illustrate different but related aspects of an organization typically related to requirements for change and development, indicating the facilities and services from within the organization or series of organizations which are required to be provided to allow the development to be accomplished.

The provision of this series of visual representations is already known and referred to by the generic title of enterprise architecture. The architecture development can comprise two main features. Conventionally, the first of these features is the generation of a series of models. Each model represents a particular aspect of the organization(s). Typically the type and number of models required can be defined by an overseeing body such as for example, a government department, or an industry organization. The purpose of the definition of the models required is to try and provide a standard which can be adhered to and therefore provide some uniformity in work done for the same government body or within a particular industry.

The second part of the architecture process is the presentation of the models in a visual manner which allows the models to be accessed and be used as a tool of implementation of particular project or process. The visual representations can typically be provided as part of an visual template which allows the user interaction and selection of one or a number of the visual representations of the models.

The characteristics of an architectural description and the method used to derive the description are laid out in a general sense in an IEEE standard. This standard is implemented by governmental bodies, commercial organizations and academic projects, each sharing some fundamental characteristics, these being; the recognition of different views onto the thing being described; different elements being created to satisfy these views and the linkage of these elements to create a consistent, traceable description access by the representations.

There are various architecture systems available, one of which is known as the Zachman Framework which sets out a template for the display of the visual representations of the models and also sets out the characteristics of models which are required to be generated. A further framework facilitates a US Government Defence architecture which has a set procedure and framework which must be followed if, for example, a tender for one of their contracts is to be accepted from a third party.

However the current approaches to technology support for architecture are problematic in that they provide different diagram types to support different views without integrating these at the diagramming element level, and in supporting one architectural framework and set of models, unless these are compatible with the set of supported diagrams. With all of these known systems the procedure for generating the models, visual representations and the framework in which the same is presented is based on the generation of a diagram. By this is meant that the generation of the visual representation is conventionally aimed at providing a two dimensional representation which will appear on the screen and which will contain the necessary features with respect to the model requirements. The procedure is therefore led by the design of the diagram and there is no depth or third dimension to the diagram which would, for example, allow further diagrams to be generated should a particular feature in the visual representation be selected, a link to a further process or the like. This therefore means that while the visual representations which are conventionally generated meet the requirements of the architecture framework set out, that is all that they can achieve and so a relatively rigid, inadaptable system is generated in the conventional systems.

Thus, when one considers that these architecture systems are commonly used to describe the motivation, goals, requirements and shape of a proposed system comprising operational processes, roles, organizations and technology it will be recognized that the same are key to the success of an organization. If in practice the same are limited or restricted so the organization can be limited and restricted in its operation.

SUMMARY OF THE INVENTION

The aim of the present invention is therefore to provide a method and apparatus for developing a business or technical architecture, the method including the ability to identify and create specific elements from general ones, and putting these specific elements together within a set of models or views, allow access through a visual representation of an architecture framework, along with an apparatus comprising the technical means to accommodate the method.

In a first aspect of the invention there is provided a method of generating a series of diagrammatic models and visual displays thereof for use within an organizational enterprise architecture, said method comprising the steps of identifying a set of specific elements contextual to the organization or methodology that are required for the architecture that is to be created; identifying the instances of these contextual elements that are required interlinking said contextual element instances, in a model integration step and generating visual displays of the models to match the diagram features required by the architecture framework and at least one of the said contextual element instances in the visual display is accessible and selectable by a user to allow access to a further display or facility.

In one embodiment the access to a further model is achieved by selecting an contextual element instance in the first display, said selection causing the generation of a further display which provides greater detail relating to the selected contextual element instance. In another embodiment selection of an contextual element instances in the display allows access to another function such as for example, another computer system or service, with which the user can interact.

Typically the method is performed within a technology and methodological environment that provides support for traceability between contextual element instances.

In a preferred embodiment the first step of the method involves the selection of a relatively small group of fundamental elements which are deemed to be key to the particular organization architecture. These elements can include, for example, resources, capabilities, personnel. These fundamental elements are provided as a toolset to the developer of the displays.

Typically, the next stage of the method involves the analysis of the contextual elements that are derived from or based upon the selected fundamental elements. The contextual elements are the features which are required to be present or performed to allow the organization to be achieved or performed. For example, the fundamental element of capability may be built upon to create the contextual elements of process, network node and location that need to be taken into consideration when defining the organization.

Both the selection of the fundamental elements and the definition of the contextual elements are dependent on the particular organization or methodology for which this method is being used and therefore all method steps are performed with reference to the organization or methodology itself and not in isolation.

With the fundamental elements and contextual elements selected and defined, these can then be utilized and integrated as required with reference to the designated architecture framework, e.g. the Zachman framework, US Department of Defense framework views to bring about the required diagrammatic representations.

In a further key feature of the invention, the identification and analysis of the elements and interlinking of the same allows a search facility to be provided. This search facility allows the selection of a contextual element instance, which appears in one of the diagrams generated by the integration step and the selection of that contextual element instance enables the database supporting the framework, and in which the elements and links between the same are stored, to search for that contextual element instance and identify to the user all of the diagrams within the architecture in which the selected contextual element instance is present. The user can then review each of these diagrams as they wish. This feature in itself is a significant improvement over conventional systems which, because they are purely based on the generation of diagrams and therefore have no information relating to each element or sub elements, do not have a database which can be searched on an element basis. As a result, at best, conventional systems only allow searching to be undertaken in a conventional key word basis.

In a further aspect of the invention there is provided a method for generating a database of information relating to an organization and fundamental elements, contextual elements and contextual element instances and allowing the organization to be represented in a series of visual displays, the visual display formats prescribed by a framework, the method comprising the step of analysing the organization to be represented, selecting a number of fundamental elements that are key to the performance of the organization, defining contextual elements based upon these fundamental elements, and modelling and interlinking contextual element instances in accordance with interdependencies between the same, and generating each of the framework prescribed visual displays in the form of diagrams and including in the diagrams the contextual element instances as required, and wherein said database has stored therein details of the fundamental elements, contextual elements, contextual element instances and the interlinking between the same within models, views and diagrams.

In one embodiment, the database with fundamental elements, contextual elements, contextual element instances and the interlinking between the same within models, views and diagrams can be referred to and utilized in the generation of visual displays for different frameworks. For example, a first framework prescribes a first set of visual displays, and, at some subsequent stage, a second framework is required which prescribes a second set of visual displays which are or more typically, are not, the same as the first set. In this embodiment, the stored elements can be used and if required, additional contextual elements are defined and stored in the database if the same are required for use in the second framework of displays.

Reference hereonin to frameworks covers and includes both those frameworks which are set by law or have the same effect as being an industry requirement, and also those frameworks which while not specifically required are expected to be used.

In one embodiment of the invention the method allows the fundamental elements, contextual elements and contextual element instances stored in the database can be matched against, updated with, and used to update, fundamental elements, contextual elements and contextual element instances stored in a second database generated by the same method. By allowing, for example, two databases created using this method to be compared one can be updated with the contents of the other.

Preferably the fundamental elements, contextual elements and contextual element instances stored in the database can be matched against, updated with, and used to update, data stored in a plurality of database or text file formats generated by any complementary method. Furthermore, the fundamental elements, contextual elements and contextual element instances stored in the database are connected to data stored in a plurality of database or text file formats generated by any complementary method, such that any updates to diagrams or definitions of said elements carried out in a plurality of other tools according to other methods, are reflected dynamically in updates to the data stored in the database, said updates being reflected back into any other tools that are also connected to said data

BRIEF DESCRIPTION OF THE DRAWINGS

A specific embodiment of the invention is now described with reference to the accompanying drawings wherein.

BRIEF DESCRIPTION OF THE PREFERRED EMBODIMENTS

Figure 1:
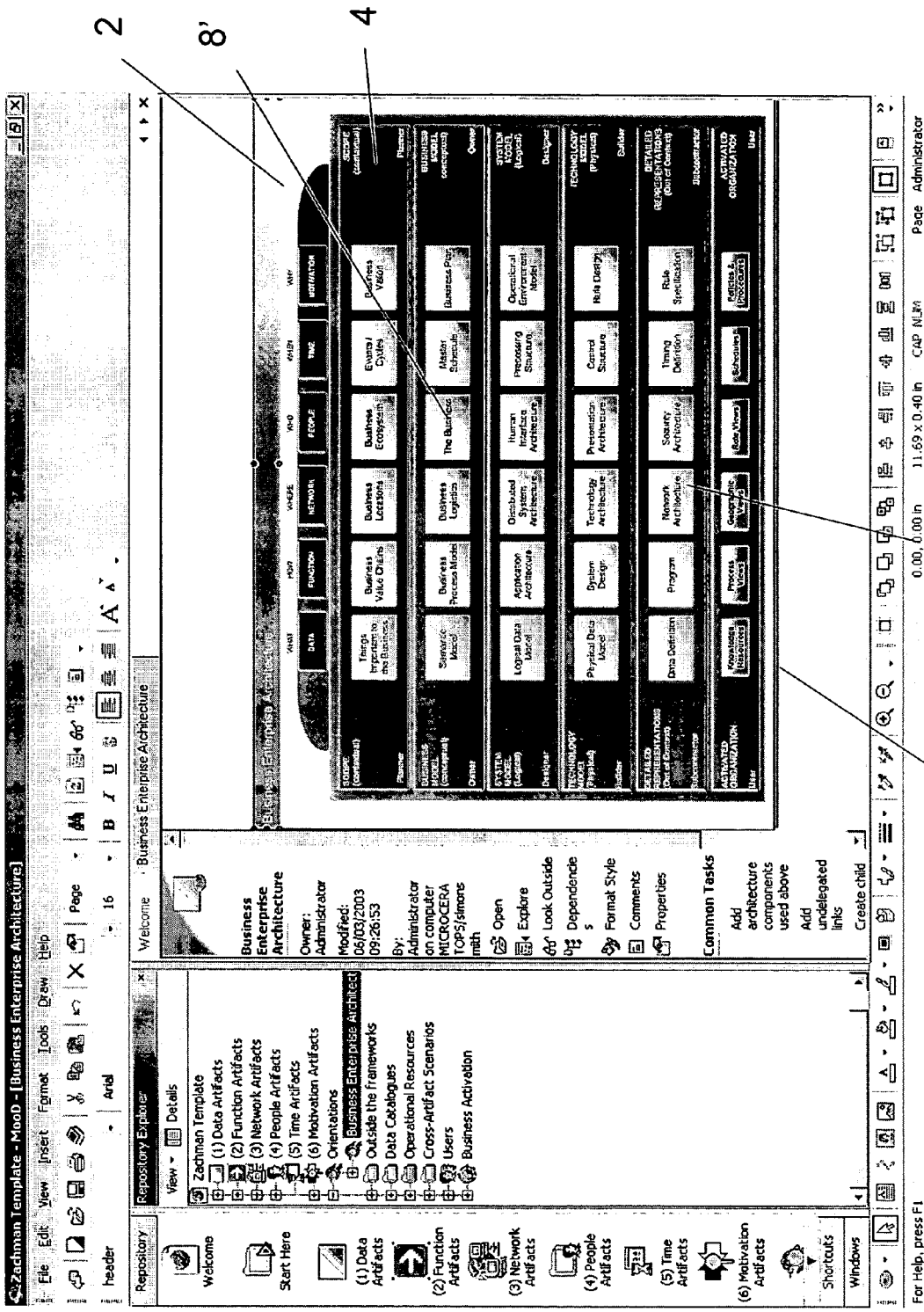
FIG. 1 illustrates a Zachman framework of diagrams.
Figure 2:
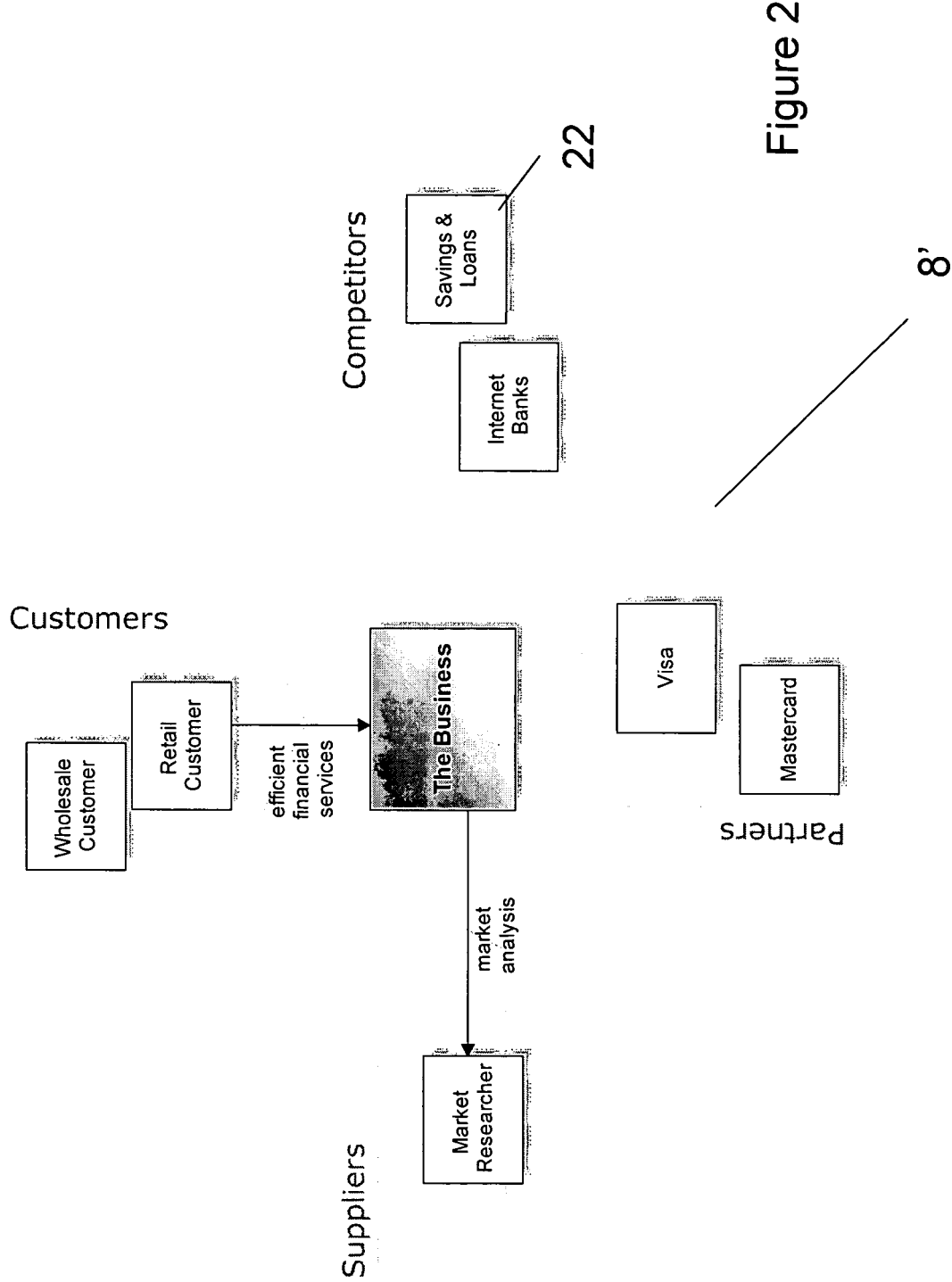
FIG. 2 illustrates a diagram in accordance with one framework requirement.
Figure 3:
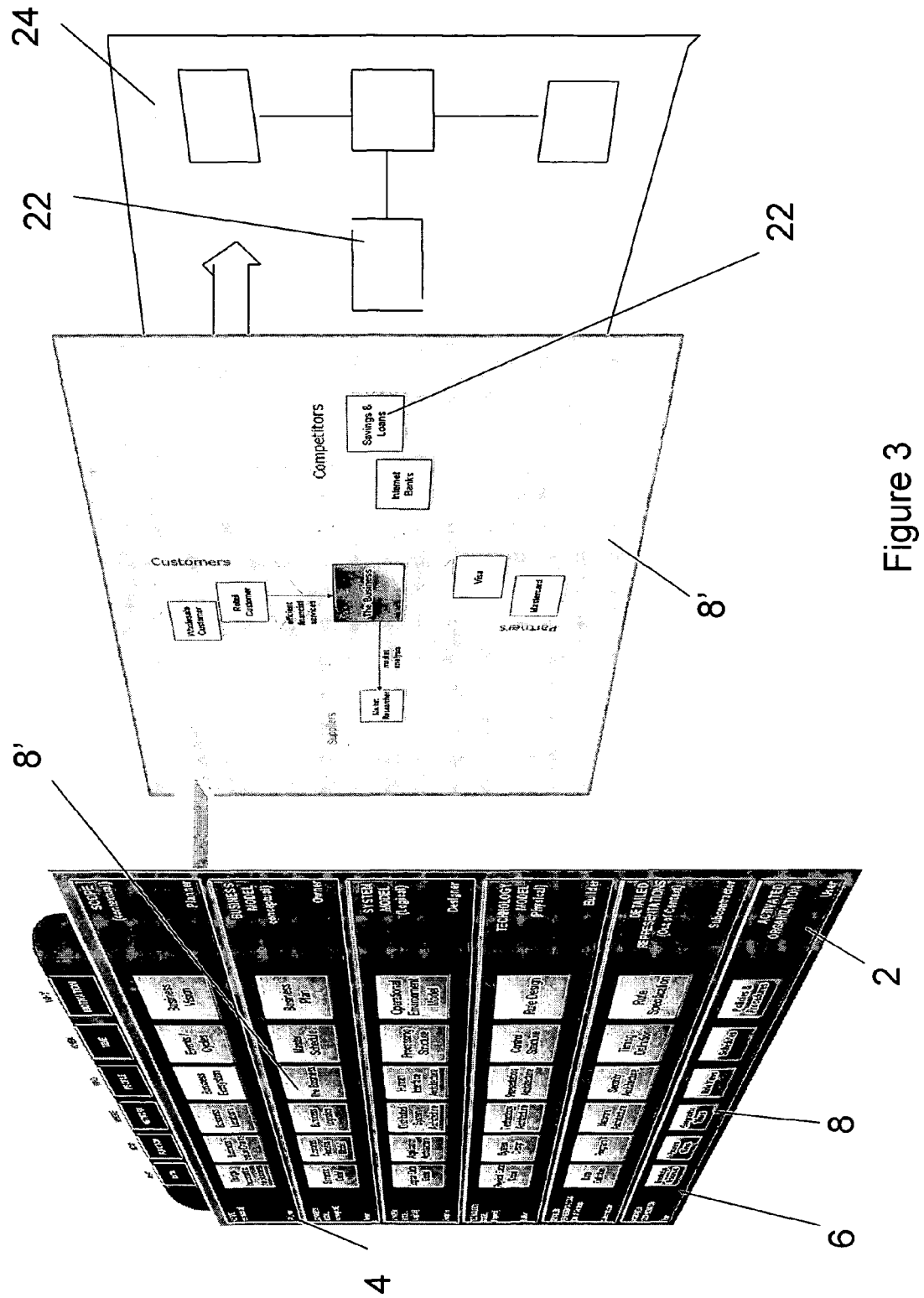
FIG. 3 illustrates in schematic form the linkages between the framework of FIG. 1 and the diagram of FIG. 2.

Referring firstly to FIGS. 1, 2 and 3 there is illustrated a framework and diagram as prescribed by the Zachman framework 2. It will be seen therefore that in FIG. 1 there are a series of rows 4 and columns 6 which have particular aspects and within the grid formed by the rows and columns, are provided a series of diagrams 8. Each of the diagrams includes the prescribed features to be included in the diagram for the particular requirement of the row and column in which the same is positioned. FIG. 2 illustrates one of said diagrams 8 which has been selected from the framework by the user using conventional computer based selection means. Thus, conventionally, the user can select and view any of said diagrams 8, typically on a computer screen. However the diagrams have purely been generated as prescribed and there is no further information available or reference between said diagrams.

The present invention provides added functionality to the provision of the framework diagrams while ensuring that the prescribed frameworks can be met. In this specific embodiment, reference is made to support and implementation with the Zachman Enterprise Architecture Framework and the U.S. Department of Defense Architecture Framework provided through this means, but is should be appreciated that the invention is applicable to any framework which prescribes particular diagrams and diagram contents.

Figure 4:
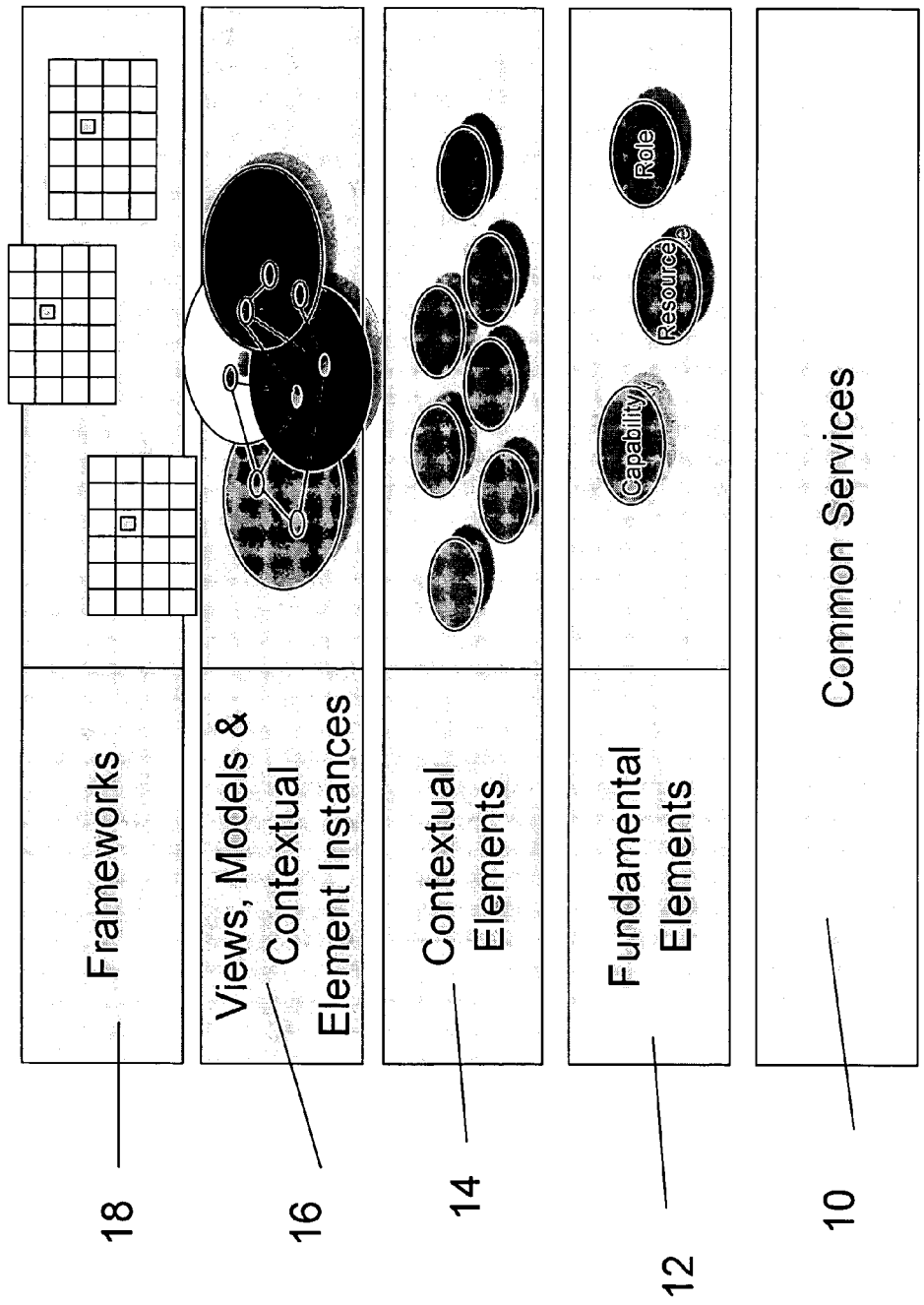
FIG. 4 illustrates in schematic form the method used in accordance with the invention.

With reference to FIG. 4 the steps in accordance with the method of the invention include the provision of a set of common services 10 such as a database or platform and management and administration facility which allows the diagrams and database to be accessible to the designated personnel. It also allows the facilities such as the diagram generation and search facility to be implemented in conjunction with the database.

With the common services in place, a toolbox of fundamental elements 12 are provided to the user such as capability, resource and role. With these fundamental elements the user can then address the organization or methodology and identify contextual elements 14 for each of these elements and these contextual elements (such as process, system node) are particular to that organization or methodology. With the contextual elements identified, models and views 16 incorporating instances of these contextual elements are developed with links between the contextual element instances identified included in the model and the visual display of the model (such as business process model, system architecture model). The particular models and visual displays representing the same are developed with respect to the required architecture framework 18 representations (such as the 6-by-6 Zachman matrix) to give an initial access (or 'shop window') into the required diagrams. However, in accordance with the invention and to the users significant benefit, said diagrams also allow user access into the underlying 'integration hub' database for the system. This allows access to further diagrammatic representations 20 in more detail, access to other functions, and/or access to search facilities i.e. identifying where a user selected element appears in the others diagrams available. This is illustrated in FIG. 3 where the Zachman framework layer 2 is first displayed resulting in the selection of diagram 8' and the generation of the diagram 8' on the screen. Then, in accordance with the invention, the user is able to select some or all elements of say "Savings and Loans" 22, which allows the generation of a further diagram 24 which provides more details with respect to the savings and loans element.

For example, the present invention, with reference to the Zachman framework elaborates on the Zachman Framework in three significant ways. Firstly it provides a start point for each of the elements, giving industry best practice models drawing on business modelling methodology as well as technical modelling notations such as UML. Secondly, each element can have linked thereto further diagrams in ever increasing detail thereby allowing a complete "drill-down" through successive modelling techniques to give a rich and deep enterprise-scale series of diagrams which are accessed in a layered access procedure. Thirdly, the invention introduces element linkage according to an underlying Zachman framework relational model, which allows for analysis as well as user browsability beyond the prescribed 6-by-6 matrix.

The present invention therefore provides a series of significant advantages to the diagram designer and subsequent users. The advantages include that the Framework gives a window onto a collection of artefacts created from a set of integrated modelling elements based on people, process and technology. The Framework can be just one orientation onto the underlying elements—other orientations, accommodating other architecture frameworks and perspectives, can coexist within the same repository.

As a result of the use of the same database, the invention supports the reuse of common components. For example, a Zachman Framework implementation in accordance with the invention acts as an integration hub for business components and their resources, such as the applications, documentation, development components or 'accelerators' with which they are themselves integrated.

Importantly, the required flexibility in development of the diagrams is retained for the choice of notation within each element and the toolset of elements and sub elements for that organization is accessible to and usable by all roles involved in the architecture for browsing or hands-on development, including management teams and business professionals.

It is a further aspect of the invention to allow respective databases to be upgraded and adapted with reference to the elements identified in the framework. For example, the underlying databases developed according to the architecture framework can be integrated with reference to databases generated in the preferred format and with data stored in other formats, created by other methods. This is because in the current invention the architecture framework acts as the defining architecture for the data stored in other places, such as Microsoft Word and Microsoft Excel (RTM) or simple diagramming tools. The data in these tools is mapped to the architecture framework, which gives structure, reporting and so on, even though the user can continue to work in the other databases. Thus any or any combination of the fundamental elements, contextual elements and contextual element instances stored in the database can be matched against, updated with, and used to update, fundamental elements, contextual elements and contextual element instances stored in a second database generated by the same method. i.e. two databases created using this method can be compared, and one is updated with the contents of the other Furthermore any or any combination of the fundamental elements, contextual elements and contextual element instances stored in the database can be matched against, updated with, and used to update, data stored in a plurality of database or text file formats generated by any complementary method. i.e. a mapping from a database formed in accordance with the invention can be defined into other sources of data, and this data is used to update the data in said database, or to be updated from the database. Thus any, or any combination of, fundamental elements, contextual elements and contextual element instances stored in the database are connected to data stored in a plurality of database or text file formats generated by any complementary method, such that any updates to diagrams or definitions of said elements carried out in a plurality of other tools according to other methods, are reflected dynamically in updates to the data stored in the database, said updates being reflected back into any other tools that are also connected to said data. As an example, a user working in another database or tool can use the database developed in accordance with the invention to provide meaning for the data and/or, structure and relationships to other data within an overall architecture. As a result the database developed in accordance with the invention acts as the means by which data can be placed and referenced to in other databases and/or tools according to an overall structure. Thus the user who is working in the database tool is only working on things of interest to them (e.g. a cost model for some business processes, used to calculate how much it will cost to run a set of processes), although their data is connected to the data being worked on in another database tool (e.g. some process definitions for those same processes that form part of a contract between a service provider and their customer).

In a further example, a new process which is added in an application, such as a contract using a rod processing tool, would also be added to the database of the current invention and would appear as a new process in, for example, a costing tool. The present invention therefore provides a way of "gluing together" data for use within an organization.

The ability to allow access to other functions via the selection of an element on the visual display by integration with specialist tools takes core architecture data and progresses this through dynamic simulation, network analysis and system development environments, according to the need reached at a particular depth within a particular element. This integration preserves traceability between elements, with Business Activation providing access to the developed artefacts from the knowledge map framework.

The ability to allow access to the developed system via the intranet-quality web publication takes the framework to a wide audience for challenge, review, training and communication and the framework can be used as a live console for running a business—in framework terms, utilising the often ignored 'functioning business' perspective of a Zachman framework, to give user access to operational business processes and their supporting enterprise applications and knowledge resources While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled

The invention claimed is:

1. A method of generating a series of diagrammatic models and visual displays thereof for use within an organizational architecture framework, said method comprising the steps of:
    identifying common services for an organization which is to be represented by the organizational architecture framework;
    identifying a set of fundamental elements which are fundamental to the organization;
    identifying a set of specific contextual elements to the organization that are required for the organizational architecture framework to be created, the specific contextual elements being derived from the fundamental elements;
    identifying instances of said specific contextual elements;
    representing said set of specific contextual elements in a first diagrammatic model;
    identifying at least a further set of specific contextual elements and representing said further set in at least one further diagrammatic model;
    interlinking said specific contextual element instances in a model integration step by interlinking said specific contextual elements in the first model via a data link to further diagrammatic models and/or specific contextual elements;
    storing each of the specific contextual elements and links between the specific contextual elements and the first and further diagrammatic models in a database;
    generating for selective display on a display screen a visual display for each of the first and further diagrammatic models;
    said visual displays including a user selectable representation of the specific contextual elements in each of the first and further diagrammatic models;
    and wherein at least one of said specific contextual elements shown on the visual display which is generated on screen for the first diagrammatic model is selectable by a user via a user controlled selection means and, upon selection, the database is accessed to access the first and farther diagrammatic model to which said selected specific contextual element is linked and the visual display representing said further diagrammatic model is displayed on screen instead of, or in addition to, said first visual display diagrammatic model with which said user can view and/or selectively interact wherein access to said further such diagrammatic models is achieved by selecting a specific contextual element instance in the first visual display, said selection causing generation of the further diagrammatic model on the visual display which provides greater detail relating to the selected specific contextual element instance while selectively displaying the selected specific contextual element instance, and the specific contextual elements are selected from a group consisting of a combination of resources, capabilities and personnel within the organization;
    wherein the method includes a search facility for the user to select to search for a specific contextual element instance which appears in the first and further diagrammatic models generated as a result of the method;
    the user selecting a first specific contextual element from the first diagrammatic model and the database in which the specific contextual elements and links between the specific contextual element instances are stored is searched for the selected specific contextual element instance and the user is informed of all of the further diagrammatic models within the organizational architecture framework in which the selected specific contextual element instance is present; and
    wherein selecting a specific contextual element allows the user to drill down through successive modeling techniques linked by the selected contextual element to provide a series of successive and different diagrammatic models modelled using different modelling techniques linked by the selected contextual element.

2. A method according to claim 1 wherein selection of a contextual element instance in the visual display allows access to another function with which the user can interact.

3. A method according to claim 1 wherein the method includes a trace between the contextual element instances.

4. A method according to claim 1 wherein a step of the method is to analyze contextual elements that are derived from, or based upon the elements identified as fundamental.

5. A method according to claim 4 wherein the contextual elements are the elements which are required to be present or performed to allow the organization to be achieved or performed.

6. A method according to claim 5 wherein a fundamental element is capability and the contextual elements are process, network node and location that need to be taken into consideration when defining the organization.

7. A method according to claim 1 wherein all method steps are performed with reference to the organization or methodology itself and not in isolation.

8. A method according to claim 1 wherein the specific elements are utilized and integrated as required with reference to a designated architecture framework to generate displays with diagrammatic representations including the specific elements.

9. A method according to claim 8 wherein the designated organizational architecture framework is a Zachman framework.

10. A method according to claim 8 wherein the designated organizational architecture framework is a US Department of Defense framework.

11. A method according to claim 1 wherein the user can review each of the identified diagrammatic models.

12. A method according to claim 1 wherein the database with fundamental elements, contextual elements, contextual element instances and the interlinking between the same within models, views and diagrams is referred to and utilized in the generation of visual displays in a manner dependent upon the designated architecture framework.

13. A method according to claim 12 wherein a plurality of designated architecture frameworks for generating respective sets of visual displays are supported and the stored elements are used along with additional contextual elements which are defined and stored in the database for selected use as required in the generation of one or more sets of visual displays when a particular architecture framework is selected.

14. A method according to claim 1 wherein the fundamental elements, contextual elements and contextual element instances stored in the database can be matched against, updated with, and used to update, fundamental elements, contextual elements and contextual element instances stored in a second database generated by the method of claim 1.

15. A method according to claim 1 wherein the fundamental elements, contextual elements and contextual element instances stored in the database can be matched against, updated with, and used to update, data stored in a plurality of database or text file formats generated by any complementary method.

16. A method according to claim 15 wherein the fundamental elements, contextual elements and contextual element instances stored in the database are connected to data stored in a plurality of database or text file formats generated by any complementary method, such that any updates to diagrams or definitions of said fundamental elements and elements carried out in a plurality of other tools according to other methods, are reflected dynamically in updates to the data stored in the database, said updates being reflected back into any other tools that are also connected to said data.

17. A method according to claim 1 wherein the diagrammatic models which are created can be selectively used in more than one form of organizational architecture framework.

18. A method of generating a series of diagrammatic models and visual displays thereof for use within an organizational architecture framework, said method comprising the steps of:
    identifying common services for an organization which is to be represented by the organizational architecture framework;
    identifying a set of fundamental elements which are fundamental to the organization;
    identifying a set of specific fundamental elements contextual to the organization that are required for the organizational architecture framework to be created, the specific contextual elements being derived from the fundamental elements;
    identifying instances of said specific contextual elements;
    representing said set of specific contextual elements in a first diagrammatic model;
    identifying at least a further set of specific contextual elements and representing said further set in at least one further diagrammatic model;
    interlinking said specific contextual element instances in a model integration step by interlinking said specific contextual elements in the first diagrammatic model via a data link to the first and further diagrammatic models and/or specific contextual elements;
    storing each of the specific contextual elements and links between the elements and the diagrammatic models in a database;
    generating for selective display on a display screen a visual display for each of the diagrammatic models;
    said visual displays including a user selectable representation of the specific contextual elements in each of the first and further diagrammatic models;
    selecting by a user via a user controlled selection at least one of said specific contextual elements shown on a first visual display which is generated on screen for the first diagrammatic model and, upon selection, the database is accessed to access a further diagrammatic model to which said selected contextual element is linked;
    displaying on screen a visual display representing said further diagrammatic model instead of or in addition to said first visual display with which said user can view and/or selectively interact wherein access to said further such diagrammatic models is achieved by selecting a specific contextual element instance in the first visual display, said selection causing searching for a specific element instance with a search facility in the database in which the specific elements and links are stored, generation of the visual display for the further said diagrammatic model which provides greater detail relating to the selected contextual element instance while selectively displaying the same, and the specific contextual elements are selected from a group consisting of a combination of resources, capabilities and personnel within the organization; and
    the user informing of all of the diagrammatic models within the organizational architecture framework in which the selected contextual element instance is present allowing the user to drill down through successive modeling techniques linked by the selected contextual element to provide a series of successive and different diagrammatic models modelled using different modelling techniques linked by the selected contextual element.

* * * * *